United States Patent
Schlüter et al.

(10) Patent No.: US 12,458,041 B2
(45) Date of Patent: Nov. 4, 2025

(54) DOSING AND MIXING INTERIM PLATE

(71) Applicant: The Livekindly Company Switzerland GmbH, Pfäffikon (CH)

(72) Inventors: Marco Schlüter, Quakenbrück (DE); Achim Knoch, Minden (DE)

(73) Assignee: The Livekindly Company Switzerland GmbH, Pfäffikon SZ (CH)

( * ) Notice: Subject to any disclaimer, the term of this patent is extended or adjusted under 35 U.S.C. 154(b) by 423 days.

(21) Appl. No.: 17/957,319

(22) Filed: Sep. 30, 2022

(65) Prior Publication Data

US 2023/0034165 A1 Feb. 2, 2023

Related U.S. Application Data

(60) Provisional application No. 63/277,498, filed on Nov. 9, 2021.

(51) Int. Cl.
*A23J 3/26* (2006.01)
*A23J 3/22* (2006.01)
*A23P 30/20* (2016.01)
*A23J 3/14* (2006.01)

(52) U.S. Cl.
CPC ............... *A23J 3/26* (2013.01); *A23J 3/227* (2013.01); *A23P 30/20* (2016.08); *A23J 3/14* (2013.01)

(58) Field of Classification Search
CPC ...... A23J 3/26; A23J 3/227; A23J 3/14; A23P 30/20; A23P 30/25
See application file for complete search history.

(56) References Cited

U.S. PATENT DOCUMENTS

| 2,914,103 | A | | 11/1959 | Ferris |
| 4,208,476 | A | * | 6/1980 | Tsao ..................... A23K 20/20 426/549 |
| 4,372,734 | A | * | 2/1983 | Dolan ..................... A23P 30/25 99/383 |

(Continued)

FOREIGN PATENT DOCUMENTS

| AU | 2002315573 B2 | 7/2005 |
| CN | 106514983 A | 3/2017 |

(Continued)

OTHER PUBLICATIONS

Translation of EP-0169126-A1 (Year: 1986).*

(Continued)

*Primary Examiner* — John J DeRusso
(74) *Attorney, Agent, or Firm* — Carr & Ferrell LLP

(57) ABSTRACT

Embodiments include a system for dosing and mixing ingredients in a High Moisture Extrusion process, the system comprising: an extruder to mix ingredients to turn them into a protein extrudate, a cooling die to cool the protein extrudate and to cool an enhanced extrudate with ingredients added after the extruder, an interim plate connecting the extruder and the cooling die, to add and mix further ingredients, and facilitate movement of the protein extrudate and the enhanced extrudate into the cooling die, the interim plate further comprising one or more interim plate inlets to allow the entry of the protein extrudate from the extruder into the interim plate, and one or more dosing inlets for adding new ingredients to the protein extrudate that exits the extruder and enters the interim plate.

20 Claims, 9 Drawing Sheets

(56) References Cited

U.S. PATENT DOCUMENTS

| | | | | |
|---|---|---|---|---|
| 4,542,686 | A | * | 9/1985 | Bansal .................. A23K 40/25 |
| | | | | 99/483 |
| 5,776,534 | A | * | 7/1998 | Christensen ......... A21C 11/163 |
| | | | | 425/464 |
| 5,981,237 | A | * | 11/1999 | Meagher ................. C12P 19/14 |
| | | | | 435/151 |
| 8,685,485 | B2 | | 4/2014 | McMindes et al. |
| 9,161,556 | B2 | | 10/2015 | Fisk |
| 2008/0089989 | A1 | * | 4/2008 | Chatel ..................... A23L 7/117 |
| | | | | 426/516 |
| 2008/0248167 | A1 | | 10/2008 | McMindes et al. |
| 2012/0237648 | A1 | | 9/2012 | Ortiz |
| 2013/0216674 | A1 | | 8/2013 | Haines et al. |
| 2022/0202040 | A1 | | 6/2022 | Knoch |
| 2022/0203593 | A1 | | 6/2022 | Knoch et al. |
| 2023/0034165 | A1 | | 2/2023 | Schlüter |

FOREIGN PATENT DOCUMENTS

| | | | |
|---|---|---|---|
| DE | 2257593 | A1 | 5/1974 |
| DE | 3714593 | A1 | 11/1988 |
| DE | 102013220746 | A1 | 4/2015 |
| EP | 0169126 | A1 * | 1/1986 |
| EP | 3100843 | A1 | 12/2016 |
| ES | 2165805 | A1 | 3/2002 |
| WO | WO1998049902 | A1 | 11/1998 |
| WO | WO2001049474 | A1 | 7/2001 |
| WO | WO2016022114 | A1 | 2/2016 |
| WO | WO2016151064 | A1 | 9/2016 |
| WO | WO2017127416 | A1 | 7/2017 |
| WO | WO2019231938 | A1 | 12/2019 |
| WO | WO2020210547 | A1 | 10/2020 |

OTHER PUBLICATIONS

Ducrocg et al., "Rubisco: A promising plant protein to enrich wheat-based food without impairing dough viscoelasticity and protein polymerisation", Jun. 21, 2020, 13 pages.

Stefano et al., "Plant RuBisCo: An Underutilized Protein for Food Applications", Aug. 13, 2018, 12 pages.

Thewis et al., "Livestock Production: Prospects Over the Next Decades and Alternative Protein Bioresources", AgroLife Scientific Journal—vol. 1, 2012, 10 pages.

Vatansever S. et al., "Low- and High-Moisture Extrusion of Pulse Proteins as Plant-Based Meat Ingredients: A Review," Cereal Foods World, vol. 65, No. 4, DOI: https://doi.org/10.1094/CFW-65-4-0038, Aug. 1, 2020, 11 pages.

* cited by examiner

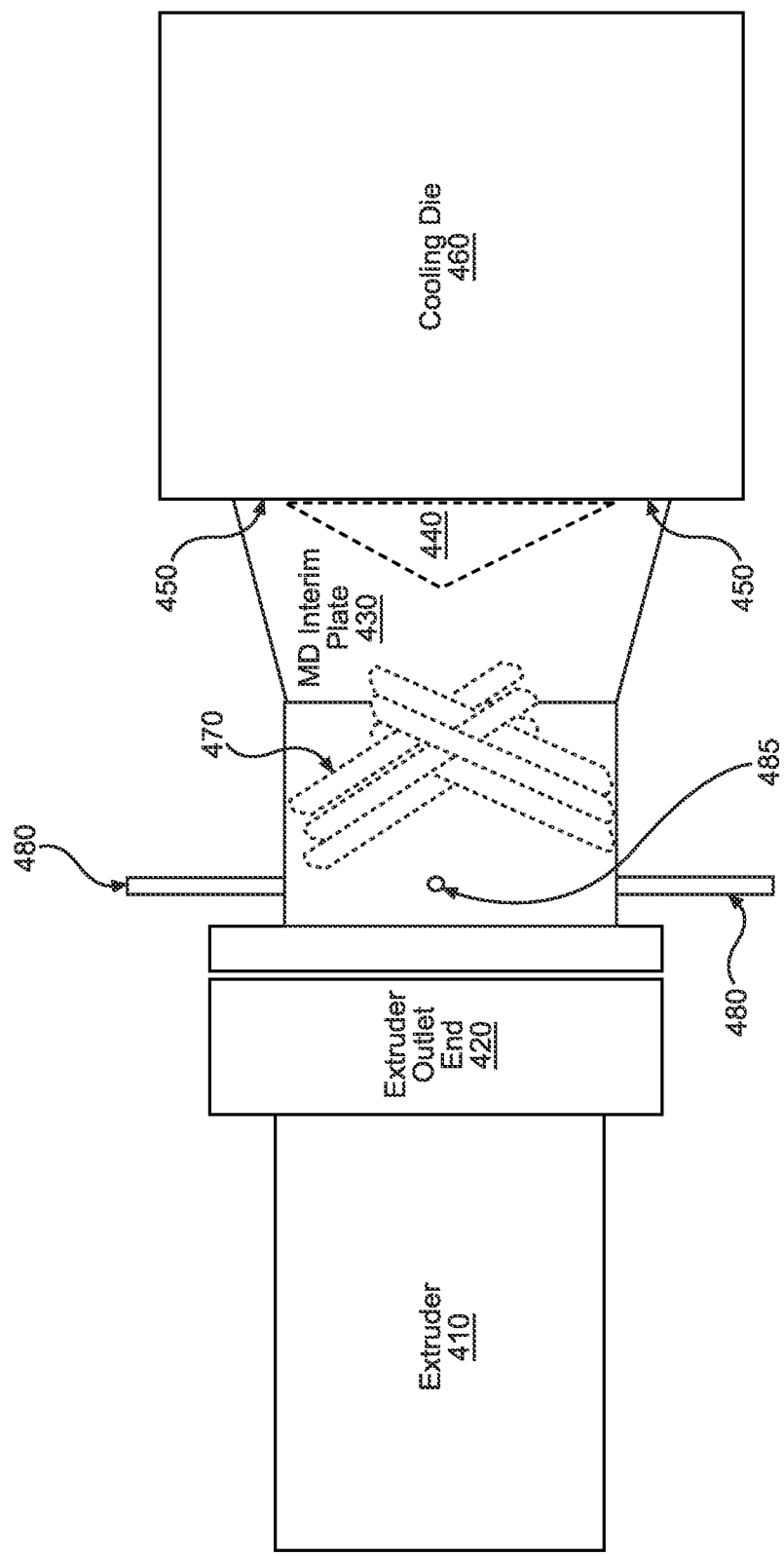

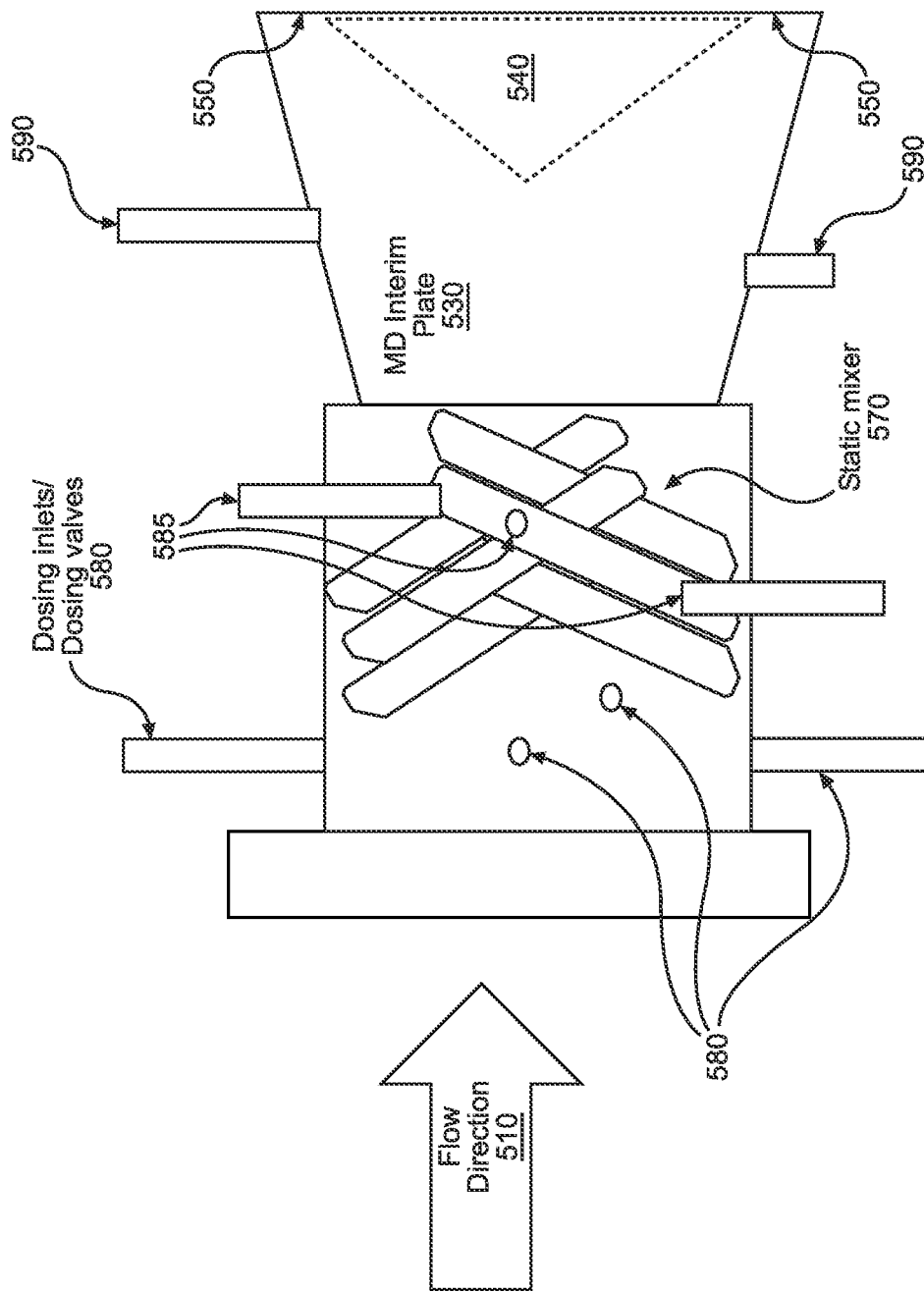

DOSING AND MIXING INTERIM PLATE

CROSS-REFERENCE TO RELATED APPLICATIONS

The present Non-Provisional Patent Application claims the priority benefit of U.S. Provisional Patent Application Ser. No. 63/277,498 filed on Nov. 9, 2021, and titled, "Dosing and Mixing Interim Plate." This application is related to U.S. Non-Provisional patent application Ser. No. 17/531,639, filed Nov. 19, 2021, and titled "Multichannel Flow Control and Extrudate Cooling", which claims the priority benefit of U.S. Provisional Patent Application Ser. No. 63/133,034, filed on Dec. 31, 2020 and titled "Multichannel Extrudate Cooling System," as well as U.S. Provisional Patent Application Ser. No. 63/175,904, filed on Apr. 16, 2021 and titled "Adjustable Cooling Die End Portion Plates", and U.S. Provisional Patent Application Ser. No. 63/277,498, filed on Nov. 9, 2021 and titled "Dosing and Mixing Interim Plate". This application is further related to U.S. Non-Provisional patent application Ser. No. 17/493,723, filed Oct. 4, 2021, and titled "Changeable Rotatable Cooling Die Outlet End Plates" which claims the priority benefit of U.S. Provisional Patent Application Ser. No. 63/133,034, filed on Dec. 31, 2020 and titled "Multichannel Extrudate Cooling System," as well as U.S. Provisional Patent Application Ser. No. 63/175,904, filed on Apr. 16, 2021 and titled "Adjustable Cooling Die End Portion Plates". These applications are hereby incorporated by reference in their entirety.

FIELD OF INVENTION

The present technology pertains to systems and methods for enhancing the High Moisture Extrusion process (HME) to produce proteins that are more meat-like. In particular, but not by way of limitation, the present technology provides a mixing and dosing interim plate (referred to herein as "MD interim plate").

SUMMARY

In some embodiments the present technology is directed to a system for dosing and mixing ingredients in a High Moisture Extrusion process, the system comprising: an extruder to mix ingredients to turn them into a protein extrudate; a cooling die to cool the protein extrudate and to cool an enhanced extrudate with ingredients added after the extruder; an interim plate connecting the extruder and the cooling die, to add and mix further ingredients, and facilitate movement of the protein extrudate and the enhanced extrudate into the cooling die, the interim plate further comprising: one or more interim plate inlets to allow the entry of the protein extrudate from the extruder into the interim plate; one or more dosing inlets for adding new ingredients to the protein extrudate that exits the extruder and enters the interim plate, the dosing inlets being placed on any location on the interim plate; an at least one static mixer, which mixes the new ingredients with the protein extrudate to form the enhanced extrudate; one or more flow channels to facilitate the movement of the extrudate and the enhanced extrudate through the interim plate and into one or more channels of the cooling die; and one or more interim plate outlets to allow the flow of the protein extrudate and the enhanced extrudate into the cooling die.

In various embodiments, the system incorporates a low degree of mixing by the static mixer, when mixing new ingredients with the protein extrudate to form the enhanced extrudate. This ensures that the enhanced extrudate is not homogenized.

BRIEF DESCRIPTION OF THE DRAWINGS

In the description, for purposes of explanation and not limitation, specific details are set forth, such as particular embodiments, procedures, techniques, etc. to provide a thorough understanding of the present technology. However, it will be apparent to one skilled in the art that the present technology may be practiced in other embodiments that depart from these specific details.

The accompanying drawings, where like reference numerals refer to identical or functionally similar elements throughout the separate views, together with the detailed description below, are incorporated in and form part of the specification, and serve to further illustrate embodiments of concepts that include the claimed disclosure and explain various principles and advantages of those embodiments.

Figure 1:
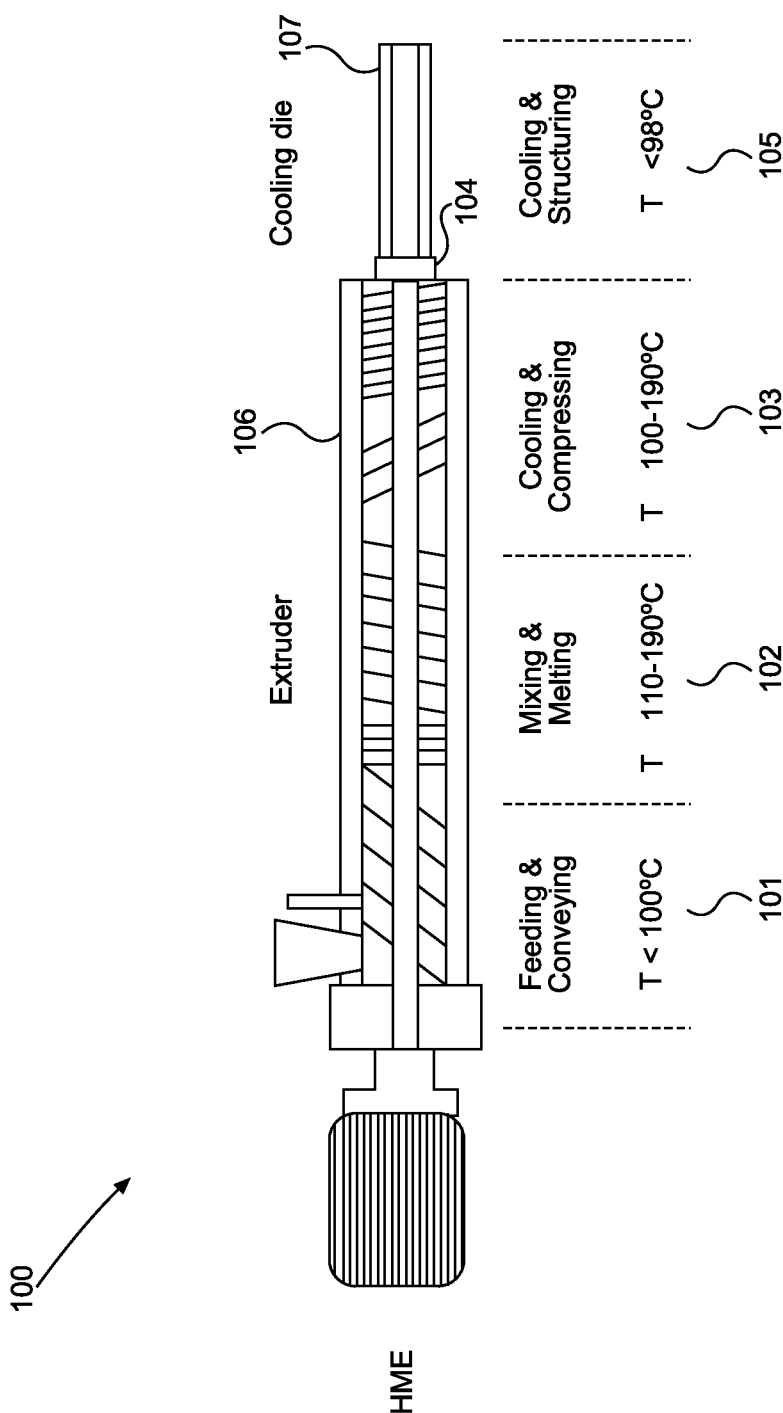

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

FIG. 1 is a diagrammatical representation of a high moisture extrusion (HME) process.

Figure 2:
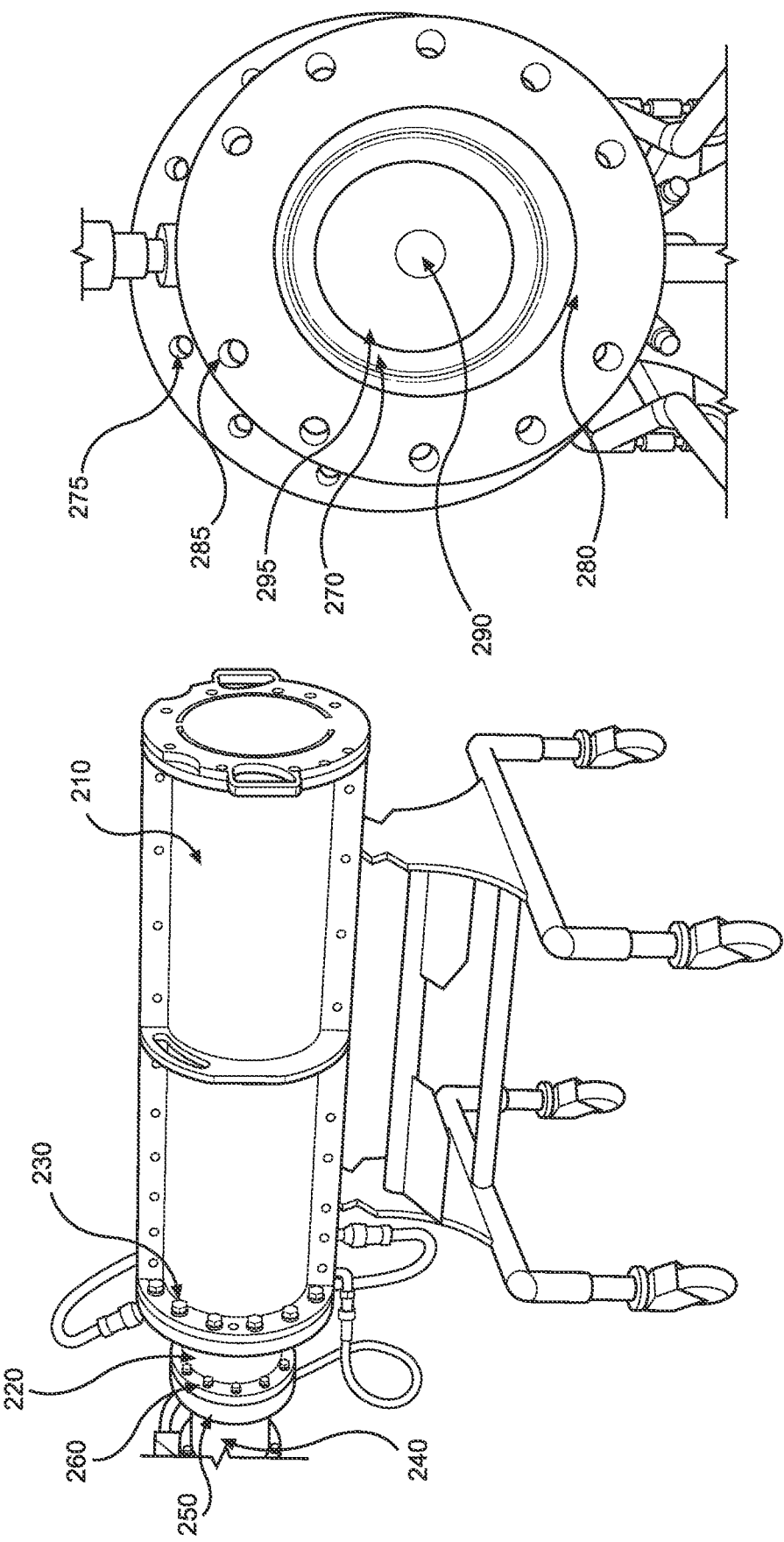

FIGS. 2A and 2B present two different views of a cooling die.

Figure 3:
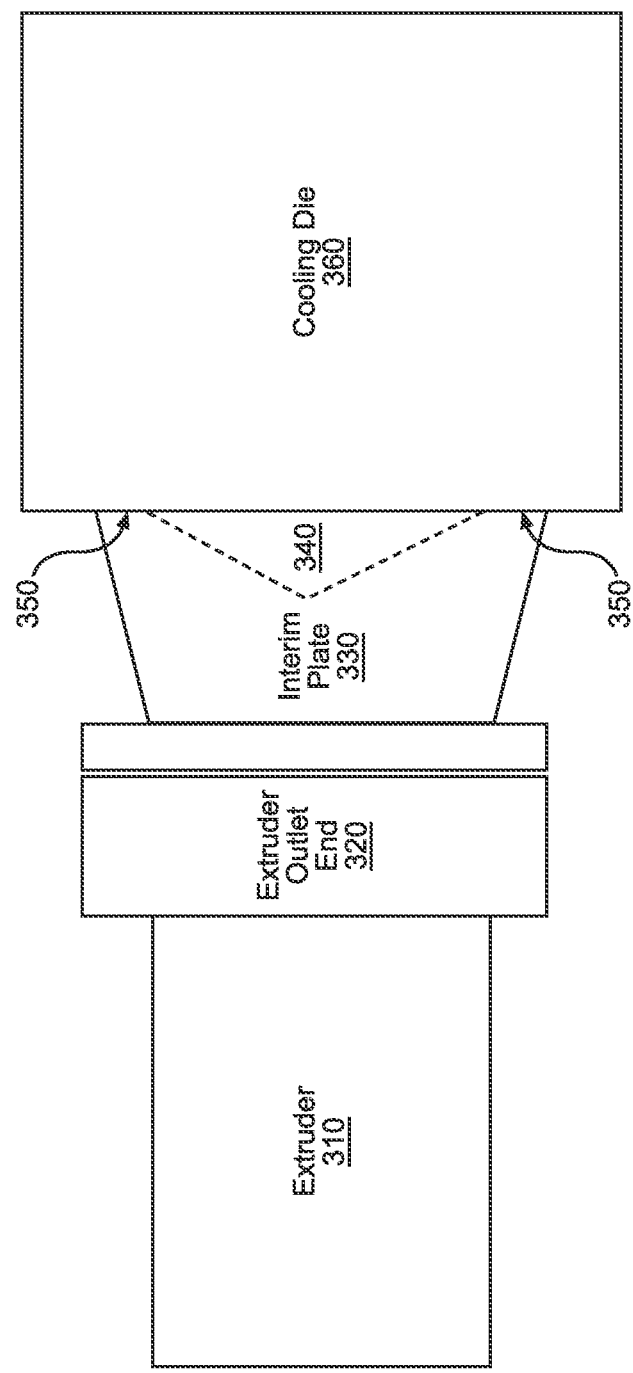

FIG. 3 presents one embodiment of an interim plate connecting an extruder and a cooling die.

FIG. 4 presents one embodiment of an MD interim plate.

Figure 5B:
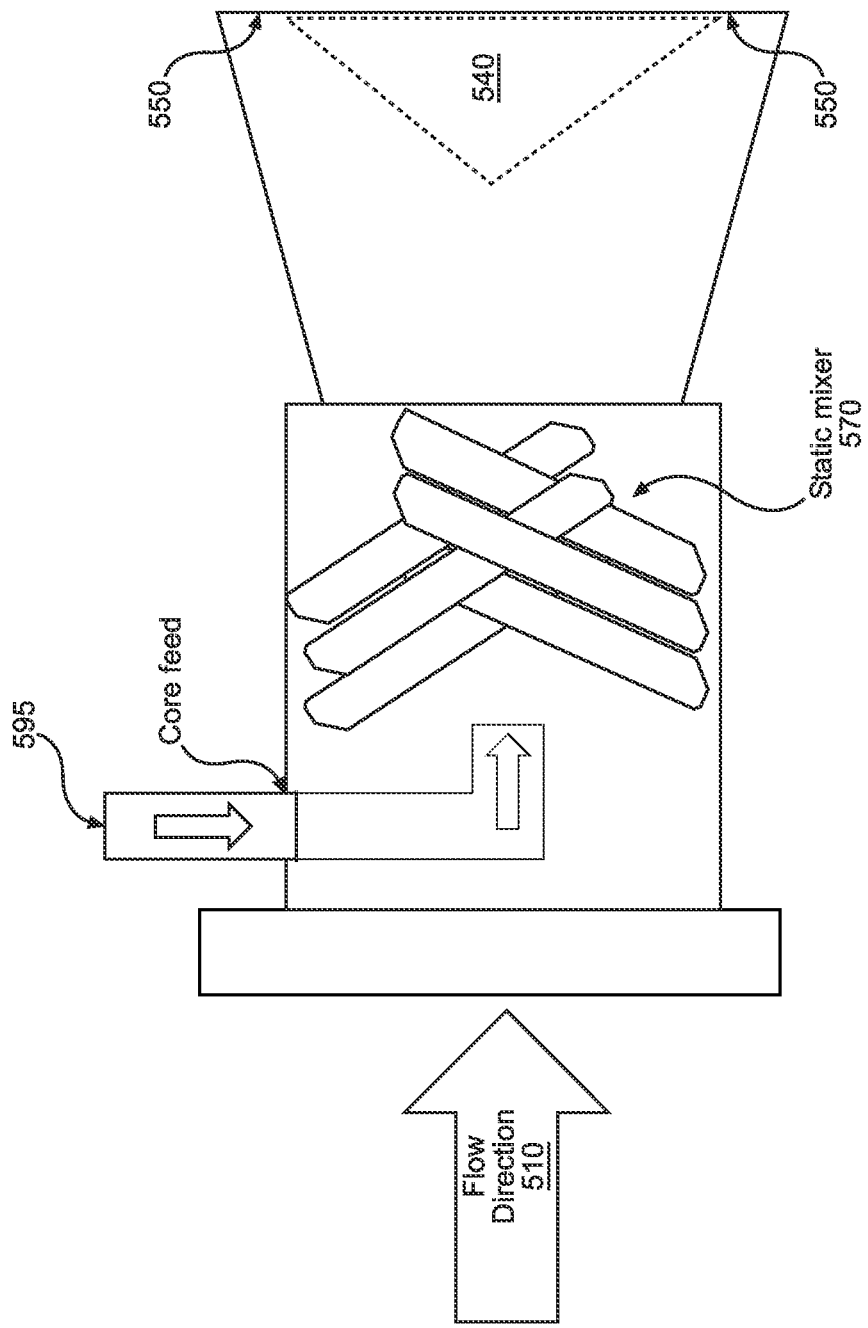
Figure 5C:
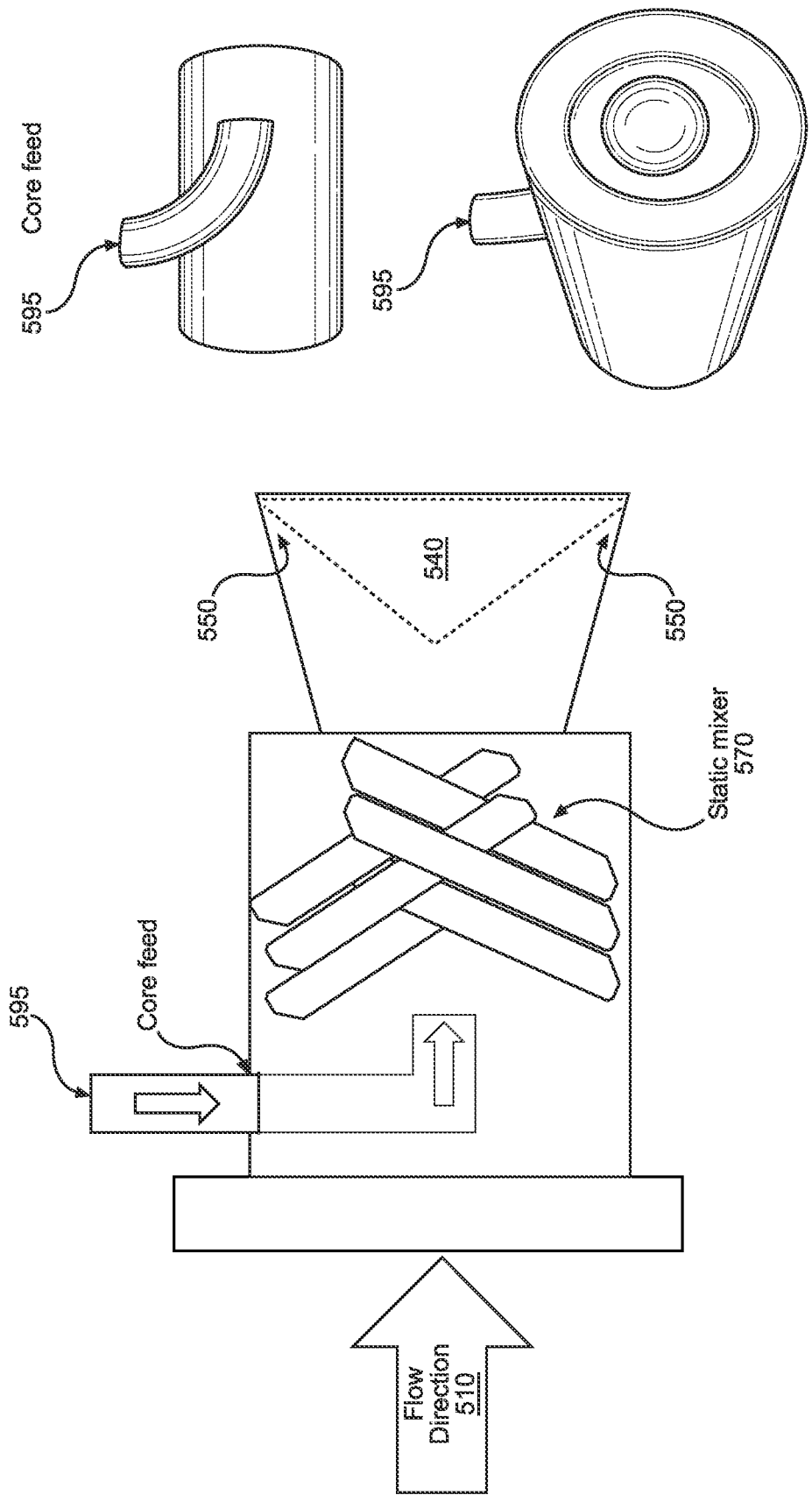

FIGS. 5A-5C present embodiments of an MD interim plate connected to the start/inlet of the subsequent die.

Figure 6A:
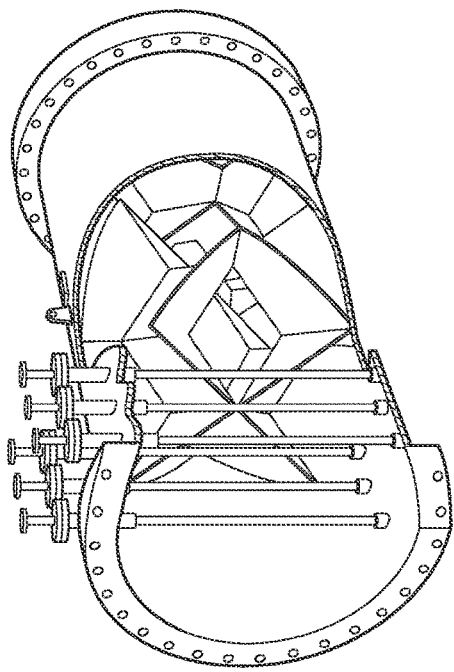
Figure 6B:
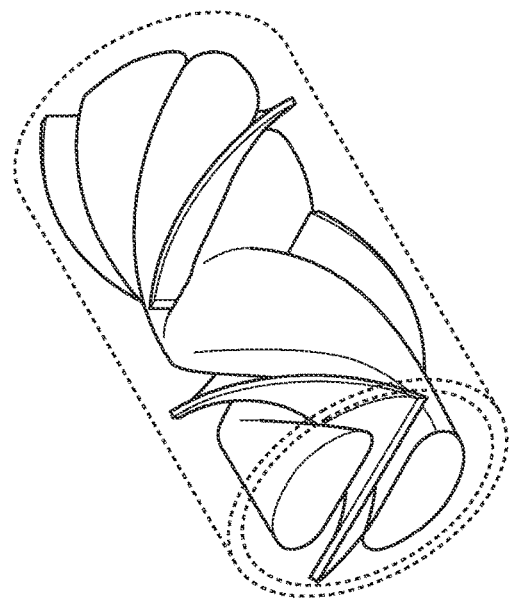
Figure 6C:
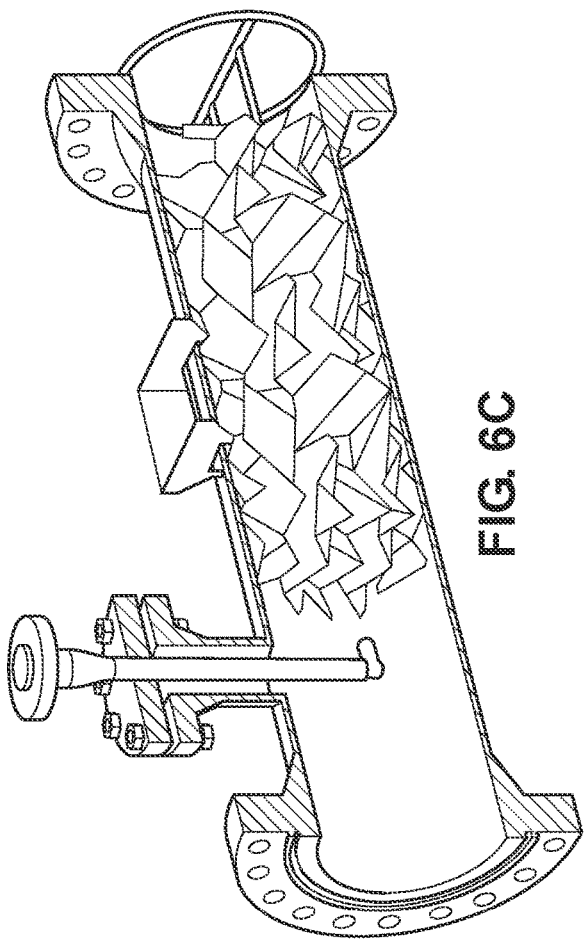

FIGS. 6A-6C present different examples of possible static mixers that may be included in MD interim plate.

Figure 7:
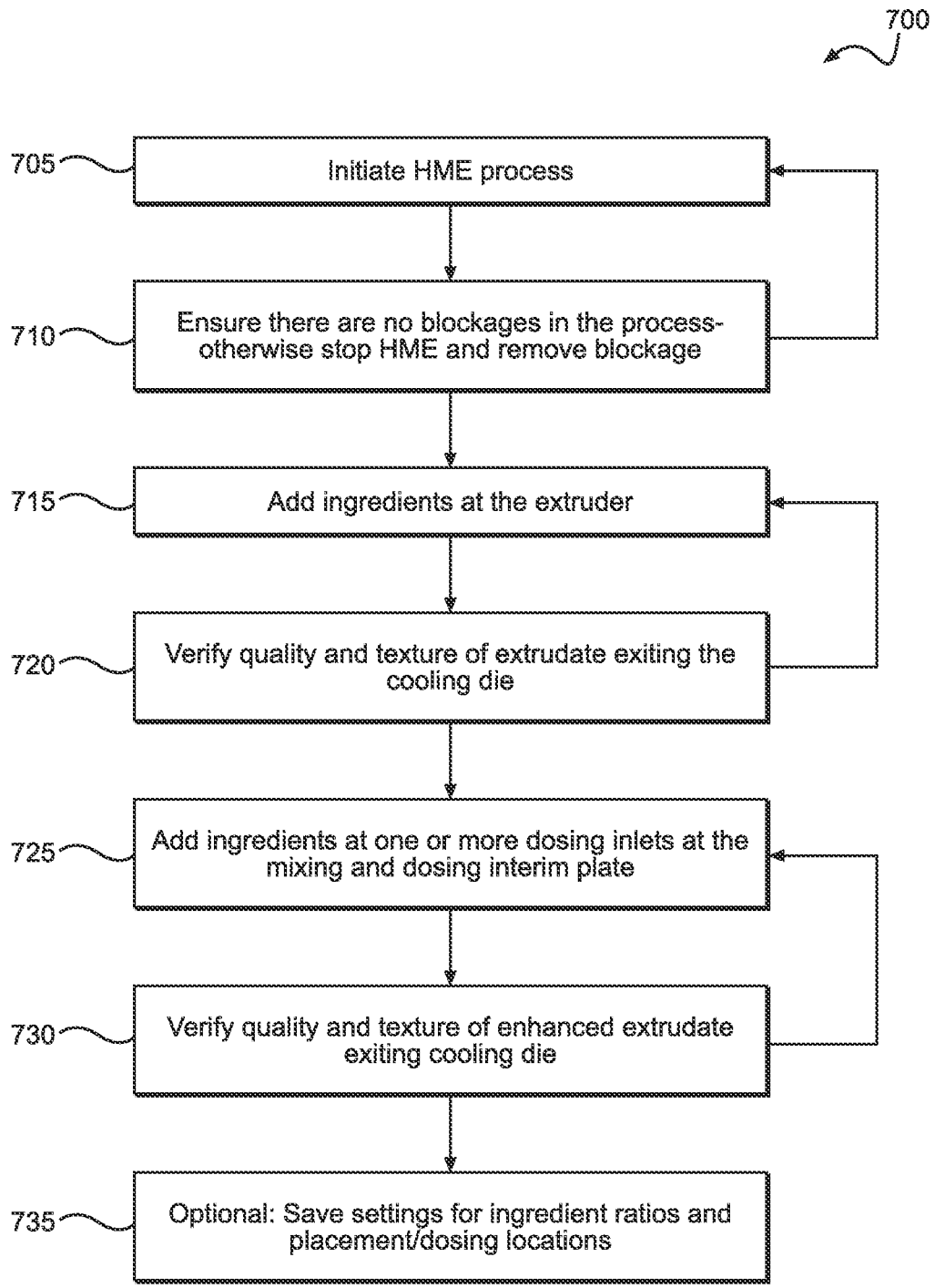

FIG. 7 presents a flow diagram of a process for an HME process that includes MD interim plate dosing and mixing.

DETAILED DESCRIPTION

Meat analogues and meat alternative products made from plant proteins, plant products, protein concentrates, and isolates are gaining in popularity, due to a variety of factors including increased environmental consciousness; specifically, the effects the meat industry is known to have on climate change, global warming, and the high level of greenhouse gases it produces. A greater awareness of animal rights in the developed world, and increased health consciousness in the general population with the promotion of low cholesterol, low fat, plant-based protein alternatives also encourage the purchase of plant-based foods by the general population.

However, in their current state, meat analogues, meat alternatives and plant-based foods and proteins may suffer from several disadvantages and shortcomings relative to natural meat. Some obvious disadvantages and shortcomings of current alternative meat products are their taste and texture, which are different from and fail to replicate that of natural meats. Plant-based alternatives also fail to resemble meats in color, shape, smell, and other physical characteristics. Finally, increasing the affordability and availability of these meat analogues and plant proteins are a challenge because producing plant-based meat alternatives are much costlier and more difficult than industrial scale meat production.

Therefore, in the field of meat analogue or meat alternative manufacturing processes, it is generally accepted that there are several goals that the final meat analogue product and the manufacturing process itself must meet; these include alternative meat products that are desirable to the senses, taste good and affordable. Further, the alternative meat products should replicate the texture of natural meats. A meat-like texture allows the bite or crunch of a meat analogue product to feel like that of natural meats to the consumer. Other goals are for the meat analogue to have the same color and/or physically resemble natural meats. Processes making meat analogue products must be scalable, highly efficient, and largely free from manufacturing defects and disruptions. Greater production line efficiency would allow the meat analogue to be affordable and widely available to the general population as a reasonable and realistic alternative to animal proteins.

To realize these goals, the meat analogue industry has moved towards a High Moisture Extrusion (HME) process (referred to herein as "extrusion", "extrusion process", "HME process" or "HME"). It is generally accepted that the HME process involves several standardized steps, these steps may be modifiable, altered, added to, or removed depending on the mixtures, recipes and ingredients used as well as the desired product outcome. However, the standard process includes feeding and conveying ingredients into an extruder, mixing, heating and melting these ingredients in the extruder, feeding the mixture into a cooling die which further cools and structures the mixture to achieve and/or maintain the desired meat-like texture and excrete it as a final or semi-finished product (referred to herein as "texturate" or "extrudate"). Post-processing steps may also be added after the HME process, after the cooling die, to the texturate/extrudate, which may include cutting and shearing the protein, or more typically after the extrudate leaves the cooling die, these steps may include cutting, shearing, cooking, freezing, storing, or adding flavors, fats and other food manufacturing and culinary additives. The adding of flavors to the extrudate is usually done before the extrudate is frozen to be packaged.

A texturized product, or an extrudate mixture produced by an extruder may be comprised of any food manufacturing ingredient including and not limited to plant proteins, soy or pea proteins or isolates, plant protein concentrates, protein isolates, meat proteins and compositions, animal milk proteins and protein products and concentrates, as well as additives such as flavor enhancers, preservatives, PH agents, color additives, fats, bonding agents and compositions, salts as well water, other solutions and liquids. The extrudate mixture may be pre-mixed before feeding into the extruder, or separate components may be added individually into the extruder, or a combination of both.

In the analogue meat industry, the texture of the texturized product or an extrudate mixture ideally should have long meat-like fibers in parallel that are placed on top of each other. One way to achieve a meat-like texture is by having a laminar flow of an extrudate mixture in the cooling die of an HME extrusion process, whereby the flow of the mixture is such that a pattern resembling a half moon shape is created. This pattern is a similar pattern to what is found in natural meats. In most current embodiments, a thickness of 10-11 mm of meat-like protein is produced, but a thickness of 20-25 mm is an ideal thickness which resembles that of natural meats like a steak or a chicken breast. These two components, plant-based meat analogue fiberization as well as the thickness of meat analogues together create a realistic culinary meat-eating experience.

Generally, after the HME extrusion process the extrudate mixture is cut or sheared to determine the shape and size of the final product and to allow the ingress and uptake of moisture by the extrudate and then cooked in water for around 20 mins to increase juiciness, creating a meat-like feel to the bite as part of a series of post-processing steps. However, cooking in water softens the extrudate, and the longer the extrudate is cooked in water, the softer it gets, losing its meat like fiberization that was produced in the extruder and cooling die portions of the HME extrusion process.

The HME extrusion process therefore uses the extruder for mixing ingredients to form a protein extrudate/texturate, and then uses an interim plate to connect the extruder to a cooling die, where the extrudate would move through to enter the die. There is usually an inlet to the cooling die with a particular shape that would facilitate or direct the flow of the extrudate towards a certain direction to enter the die. By the time the extrudate enters the die, the extrudate has cooled for a small amount, but the primary cooling and the place where the fibers and structure of the protein mix extrudate/texturate are largely formed and the extrudate becomes difficult to alter, is after the extrudate is cooled and structured inside the cooling die. Usually, the post-cooling steps after the cooling die such as cutting, and cooling are used to add new ingredients, textures or flavors into the protein extrudate.

Additionally, in current HME processes, texturing of the extrudates takes place primarily in the die. The extruder provides the protein melt for this purpose, which is achieved via very high temperatures, shearing and high pressures. These conditions lead on the one hand to a protein structure in which the water is largely immobilized and on the other hand to a structure that is fibrous but compact. As a result, the product is often too firm and compact compared to meat and forms a sensory impression that is too dry.

Thus, if additional ingredients need to be added to the extrudate, before the fibers and structures of the extrudate have been set, they must be added to the extrudate before the cooling die, currently the only way to do so is to add the new ingredients in the extruder. However, the extruder mixes all the ingredients thoroughly, and under intense heat, and therefore any ingredient added in this step would lose its texture, shape, and fibrous connections. Ingredients may also lose their color, scent and flavor when added into the extruder. Furthermore, the heat produced in the extruder may destroy nutritional elements of the ingredients added, since heat is known to destroy vitamins and in foodstuffs.

The systems and methods presented herein aim to provide a new method of adding ingredients in the HME process via a mixing and dosing interim plate (referred to herein as an "MD interim plate"), that would avoid the heavy mixing and high temperatures of the extruder but at the same time add ingredients to the extrudate, before it hardens, and before the fibers and structure of the protein are formed and set. In various embodiments, an ingredient MD interim plate device is presented, whereas the portion, or device connecting the extruder and the cooling die, is used to add and mix ingredients to the extrudate, and in some embodiments, under cooler conditions than the extruder. The state of the protein extrudate that exists in the area (i.e., the interim plate) between the extruder and the die is suitable for the addition of additives to influence the structure or the taste. The possibility of adding additives of various kinds in the interim plate creates a new instrument of extrudate protein structure design, which enables a very wide field of variation for creative fiber creation and design. All the ingredients that may be added to the MD interim plate will be collectively referred to as "ingredients" or "ingredient". This may include ingredients not listed in this document.

In various embodiments, a more pronounced and less compact fiber structure in general can be achieved by the addition of many types of ingredients including and not limited to solids, high viscous liquids, pH-value influencing additives, water, water vapor, gases, salts, flavorings, colorings, oils and fats. The texture of the extrudate may be opened or widened by adding special substances that are able to partly disturb the texturization process, preventing a tight or compact fibrous design or texture. Another benefit is that in some embodiments, the mixing is done roughly, not thoroughly or homogenously, leading to a more natural feeling, tasting and looking product that has heterogenous texturization, for example, if fat is added to an extrudate, some of the fat may be mixed in while the other part of the part may for a natural-like fat strip on a part of the protein resembling a steak. These ingredients may be added at the MD interim plate.

Salts and salt solutions that may be used as dosing ingredients can comprise a variety of types ranging from sodium-based salts, and including but not limited to table salts, kosher salts, Himalayan pink salts, Kala Namak sea salts, infused sea salts, Sel Gris, rock salts, flake salts, black or red Hawaiian salts, pickling salts, smoked salts, iodized salts, mineral salts, fine or coarse gained salts, smoked sea salts, organic salt, grey salt, French sea salt, Fleur de Sel, grinder salt, finishing salt etc. Non-sodium-based salts may also be used such as potassium salts like potassium chloride. Salt-substitutes such as canallite, kieserite, polyhalite, sylvite, kainite and langbeinite among others may also be used.

Gases that are added as ingredients or new ingredients at the MD interim plate include Nitrogen gas, which has an impact on the texture of the extrudate, forming a lighter yet crunchy protein mixture. Carbon dioxide may also be added to influence the PH value of the extrudate or mixture. Carbon dioxide may also amend protein structure. Carbon monoxide can also be used when wanting to influence PH values for milk and dairy products.

Other liquids may be added at the MD interim plate phase include plant-based bullion with flavors and/or spices/spice extracts and/or conservatives and/or minerals of nutritional value and/or coloring substances, broths and stocks, plant-paste solutions, flavored, enhanced and/or water solutions with PH agents, fat additives and other agents. The salt solution may also be of varying concentrations, with some cooking solutions using a high salt concentration, while others a lower concentration, depending on the desired texture effect as well as the ingredients used in the extrudate.

For all embodiments described in this document, the extrudate may be comprised of varying parts of plant-based proteins and compositions, these include but are not limited to soy protein concentrates, pea protein isolates, rice protein, soy protein isolates, wheat protein, canola protein, sunflower protein, oat protein, potato protein, fava bean or other bean type proteins, mung bean proteins, mycoproteins, chia seed protein, hemp seed proteins, etc. In various embodiments, animal-based milk proteins, whey, casein and other milk proteins and concentrates may be used. In some embodiments animal meats and derivatives may be used as part of the extrudate.

While the present technology is susceptible of embodiment in many different forms, there is shown in the drawings and will herein be described in detail several specific embodiments with the understanding that the present disclosure is to be considered as an exemplification of the principles of the present technology and is not intended to limit the technology to the embodiments illustrated.

FIG. 1 is a simplified representation of the moisture extrudate extrusion HME process 100, which is comprised of feeding material and conveying it 101 into an extruder 106, then mixing, heating, and melting 102 the extrudate mixture at 110-190° Celsius (230-374° F.), followed by cooling and compressing 103 the mixture in the extruder at a temperature 100-190° Celsius (230-374° F.). Finally, the extrudate material is fed into the cooling die 107 through the interim plate 104, which connects the extruder and cooling die. The cooling die 107 cools the extrudate mixture to an outlet temperature of under 98° Celsius (208° F.) and structures it 105. This schematic drawing is an example of one possible technical relationship/configuration between the extruder and the cooling die and does not purport to represent all other configurations, relationships, or sizes of either the extruder, the cooling die, or their possible configurations.

FIGS. 2A and 2B present two different views of a cooling die interim plate. In FIG. 2A a cooling die 210 can be seen connected to the interim plate 220. The interim plate may be connected to the cooling die 210 using an attachment mechanism 230 which may include any, or a combination of screws, bolts, fasteners, chains or other attachment mechanisms or other attachment mechanisms such as a locking rod, an elongated member or fastener (all these connection, fastening and attachment mechanisms are collectively referred to herein as "attachment mechanisms"). The extruder 240 may be seen and is also attached to the interim plate through its outlet end 250 via attachment mechanisms 260.

FIG. 2B presents a front view of the interim plate outlet end 270 connected to the cooling die 210. Apertures 275 may be used to connect and secure the interim plate 220 to the cooling die 210. The inlet end 280 of the interim plate is what attaches to the outlet end of an extruder via attachment mechanisms that may be connected through apertures 285. The cone 290 of the interim plate directs the flow of the extrudate into a ring shape which matches the inlet 295 of the cooling die 210.

FIG. 3 is a diagrammatical representation of one embodiment of an interim plate connecting an extruder and a cooling die. Extruder 310 is connected to the interim plate 330 via the extruder outlet end 320. The extruder outlet end 320 and the interim plate 330 are connected via attachment mechanisms. The interim plate 330 facilitates the flow of extrudate to the inlet 350 of the cooling die 360. The interim plate 330 is connected to the cooling die 360 via attachment mechanisms. In some embodiments as the ingredients and extrudate are mixed, they form an enhanced extrudate that may be directed by cone 340 towards the inlet 350.

FIG. 4 is a diagrammatical representation of one embodiment of a dosing and mixing interim plate 430. Extruder 410 is connected to the mixing and dosing interim plate 430 via the extruder outlet end 420. The extruder outlet end 420 and the MD interim plate 430 are connected via attachment mechanisms. The MD interim plate 430 facilitates the flow of extrudate to the inlet 450 of the cooling die 460. The MD interim plate 430 is connected to the cooling die 460 via attachment mechanisms. Dosing inlets (also referred to herein as dosing valves") 480 and 485 may be placed anywhere on the MD interim plate 430 and are used to add ingredients or doses of ingredients (dosing) to the extrudate flowing through the MD interim plate 430. In this embodiment two vertical dosing inlets 480 are used on this interim plate at the top and bottom of the MD interim plate 430. Horizontal dosing inlet 485 allows the dosing or addition of ingredients from the side position of the MD interim plate 430. When multiple dosing inlets are present, one or more of them may be used. Some inlets may be open and dose the extrudate with ingredients, while others may be closed to prevent the addition of ingredients. As ingredients are added through dosing inlets 480 and/or 485, the extrudate flowing through the MD interim plate as well as the ingredients are mixed via static mixer 470. Static mixer may be of any type of static mixers known in the art.

In some embodiments, dosing inlets like dosing inlets 480 and 485 are placed in positions that dose the extrudate in specific points in the static mixer 470. This may be to allow some ingredients to be added to the extrudate before the static mixer 470 and other ingredients added to the extrudate further along the MD interim plate 430 and/or directly into the extrudate flowing through the static mixer 470. This is so that some ingredients are dosed when the extrudate is still hot and the fibers and structures have not been set, or when the extrudate has travelled further along the MD interim plate 430 when the fibers are more structured and cooler. Adding ingredients at different points through the MD interim plate 430, as well as using different amounts of ingredients means that there are a multitude of different possibilities to create new textures with different combinations of ingredients, dosing positions and dosing amounts. In some embodiments as the ingredients and extrudate are mixed, they form an enhanced extrudate that may be directed by cone 440 towards the inlet 450.

FIGS. 5A-5C present embodiments of an MD interim plate connected to the start/inlet of the subsequent die. In some embodiments as the ingredients and extrudate are mixed, they form an enhanced extrudate that may be directed by cone 540 towards interim plate outlets 550. The extrudate or texturate flows through from the extruder in flow field/flow direction 510 entering the MD interim plate 530 and taking with it the added ingredients such as liquids, fats, gases, flavorings etc. As the extrudate travels through the MD interim plate 530, it can be dosed with ingredients such as fluids and/or gases at dosing inlets or dosing valves 580. This could be as soon as the extrudate enters the MD interim plate 530 or exits the extruder. As the extrudate travels further into the static mixer 570, the ingredients dosed at dosing valves 580 are mixed with the extrudate through the static mixer. In some embodiments, dosing inlets or dosing valves 585 are placed to dose ingredients into the extrudate as it is flowing through the static mixer. Dosing inlets 585 may be directly attached to apertures or openings of static mixer, or just be placed in a position where ingredients may flow to that position in the static mixer 570. In some embodiments, as the ingredients and extrudate are mixed, they form an enhanced extrudate that may be directed by cone 540 towards interim plate outlets 550. In various embodiments, dosing valves 590 are placed near the cooling die or after the static mixer, this allows the addition of ingredients after mixing but before cooling, and at a cooler temperature as it is closer to the cooling die.

The area of transition between the extruder and the die, i.e., the MD interim plate where the protein extrudate is in the transition zone from liquid to solid and where fiber formation essentially begins, can be described as sensitive. Therefore, the possibility of tempering the jacket of this unit should be given to be able to react to changes in the conditions if necessary. Different ratios of protein extrudate to ingredient(s) may be used, in preferred embodiments a ratio of 90-95% protein extrudate (extrudate coming out of extruder) and 5-10% of dosing ingredients into the MD interim plate. However, the ratios could be at any level between the protein extrudate and ingredient(s).

In various embodiments, the dosing inlets/dosing valves 580, 585 and 590 may be made of heat and/or cold resistant metal or material. This is because ingredients may be added close to the extruder and may be susceptible to overheating or added close to the cooling die and be exposed to cool temperatures. In various embodiments these dosing inlets 580, 585 and 590 are made from stainless steel and/or PEEK material. The dosing inlets 580, 585 and 590 may include one or more safety valves. In some embodiments each dosing inlet will have its own safety valve, while in others, a safety valve may be used for more than one dosing inlet 580, 585 and 590. Safety valves ensure that users will be able to stop any flow of ingredients or other matter from the dosing inlets 580, 585 and 590 to the MD interim plate 530. The pressure of the dosing inlets 580, 585 and 590 must be higher than the pressure of the flow field/flow direction 510, otherwise, dosing would not be possible and extrudate would travel through the dosing inlets 580, 585, and 590. One way to ensure pressure of the dosing inlets 580, 585 and 595 meet required thresholds may be by using gear pumps. In some embodiment one gear pump may be used for all dosing inlets 580, 585 and 590, while in others a gear pump may be used for one or more dosing inlets 580, 585 and 590.

In various embodiments the pressure of dosing inlets 580, 585, and 590 are measured by one or more pressure sensors, and/or by having the gear pump(s) attached to the control mechanisms of the extruder. Extruder control techniques register pressure in the outlet or outlet end of the extruder area, when there is a signal that pressure is increased, the extruder control mechanisms notify the gear pumps linked to the dosing inlets 580, 585, and 590 that the dosing inputs must also go up in pressure by at least the amount that the pressure in the extruder outlet area/outlet has increased. The pressure in each dosing inlet must be higher than the pressure of flow direction 510 coming out of the extruder. In some embodiments, the dosing inlets 580, 585, and 590 are placed in preset holes, the holes may be sealed with a screw like cap mechanism, the dosing inlets may be attached to the preset holes that lead to the interior of the MD interim plate 530 via screws or other attachment mechanism(s). In various embodiments pipes or hoses that transport the ingredients are set, placed in or connected to the dosing inlets 580, 585 and 590 and may be connected to one or more gear pumps and safety valves. Whereby the inlets that are being utilized are opened and the others are closed or sealed.

In a further embodiment, the dosing inlets 580, 585 and 590 may also be designed as a single core feed 595. In this case, the material to be fed to the extruder flow is fed directly to the core through a single pipe. This is a tube in tube solution made of heat and/or cold resistant metal or material. This is because the ingredients may be added near the extruder and may be susceptible to overheating, or may be added near the cooling nozzle and may be exposed to cold temperatures. In various embodiments, this core feed 595 is made of stainless steel and/or PEEK material. The core feed 595 includes one or more safety valves. In some embodiments, this metering inlet has its own safety valve. The safety valve ensures that the user is able to stop the flow of ingredients or other substances from this core feed 595. The pressure of the dosing inlet (core feed) must be higher than the pressure of the flow field/flow direction, otherwise dosing would not be possible and the extrudate would run back through the dosing inlet. One way to ensure that the pressure into the core dosing inlet maintains the required limits is to use gear pumps.

FIGS. 6A-6C present different examples of possible static mixers that may be included in dosing and mixing interim plate. FIGS. 6A-6C present static mixers where mixing of ingredients with the extrudate is done by having the ingredients and extrudate go through one or more flow channels with multiple blockers that redirect the flow mixing the extrudate with the dosed ingredients into an enhanced extrudate as they travel through the static mixer. Multiple static mixer types with various inner workings and shapes may be used, and in some embodiments more than one static mixer may be included or used in the MD interim plate, where the flow may travel from one static mixer to another. In some embodiments the static mixers may have blockers or flow paths that separate the two flows and then join them at different points in the MD interim plate. In several embodiments the dosing inlets are connected directly to a static mixer to distribute the added gases and liquids homogeneously in the protein melt. This static mixer consists of flow-influencing elements that alternately divide the material flow and then recombine it, thus achieving mixing.

FIG. 7 presents a flow diagram 700 of a process for an HME process that includes MD interim plate dosing and mixing. In this embodiment the HME process is initiated normally 705, users or managers of the process must ensure that there are no blockages in the process 710, otherwise the HME has to stop, and blockages removed. Ingredients are added at the extruder 715 to produce the plant protein extrudate/texturate. The produced extrudate exiting the cooling die must be verified 720 to be of the desired texture, type and/or quality. Otherwise, the ingredients or their ratios must be modified by adding a new batch of ingredients again 715. If the extrudate quality is verified, then ingredients are now added at one or more dosing inlets/valves at the MD interim plate 725. The enhanced extrudate produced after dosing at the MD interim plate must now be verified 730 as of the desired type, quality, and texture. Otherwise, the ingredients or their ratios must be modified by adding ingredients again at the MD interim plate 725. The quality and texture of the enhanced extrudate is now set as desired. In some embodiments, the settings, dosing locations at the MD interim plate, or formulae used for the ratio of ingredients at the extruder and/or the MD interim plate are either saved 735 automatically and electronically, or manually by users of the system, so that the desired texture, type, and quality of enhanced extrudate produced may be replicated at a later or subsequent HME extrusion with interim plate dosing and mixing.

The foregoing detailed description includes references to the accompanying drawings, which form a part of the detailed description. The drawings show illustrations in accordance with exemplary embodiments. These example embodiments, which are also referred to herein as "examples," are described in enough detail to enable those skilled in the art to practice the present subject matter.

The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents. In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description but is not intended to be exhaustive or limited to the invention in the form disclosed. Many modifications and variations will be apparent to those of ordinary skill in the art without departing from the scope and spirit of the invention. Exemplary embodiments were chosen and described to best explain the principles of the present technology and its practical application, and to enable others of ordinary skill in the art to understand the invention for various embodiments with various modifications as are suited to the particular use contemplated.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel or may be performed at different times.

The various embodiments described above, are presented as examples only, and not as a limitation. The descriptions are not intended to limit the scope of the present technology to the forms set forth herein. To the contrary, the present descriptions are intended to cover such alternatives, modifications, and equivalents as may be included within the spirit and scope of the present technology as appreciated by one of ordinary skill in the art. Thus, the breadth and scope of a preferred embodiment should not be limited by any of the above-described exemplary embodiments.

What is claimed is:

1. A system for dosing and mixing ingredients in a High Moisture Extrusion process, the system comprising:
    an extruder to mix ingredients to turn them into a protein extrudate;
    a cooling die to cool the protein extrudate and to cool an enhanced extrudate with ingredients added after the extruder; and
    an interim plate connecting the extruder and the cooling die, to add and mix further ingredients, and facilitate movement of the protein extrudate and the enhanced extrudate into the cooling die, the interim plate further comprising:
        one or more interim plate inlets to allow the entry of the protein extrudate from the extruder into the interim plate;
        a plurality of dosing inlets for adding new ingredients to the protein extrudate that exits the extruder and enters the interim plate, the plurality of dosing inlets being placed on any location on the interim plate;

an at least one static mixer, which mixes the new ingredients with the protein extrudate to form the enhanced extrudate;

a dosing inlet of the plurality of dosing inlets being placed to dose the protein extrudate further along the interim plate than the at least one static mixer;

one or more flow channels to facilitate the movement of the protein extrudate and the enhanced extrudate through the interim plate and into one or more channels of the cooling die; and one or more interim plate outlets to allow the flow of the protein extrudate and the enhanced extrudate into the cooling die.

2. The system of claim 1, wherein the degree of mixing by the static mixer of the new ingredients with the protein extrudate to form the enhanced extrudate is a low degree of mixing, the low degree of mixing being such that the enhanced extrudate is not homogenized.

3. The system of claim 1, a dosing inlet of the plurality of dosing inlets being placed on a top of the interim plate.

4. The system of claim 1, a dosing inlet of the plurality of dosing inlets being placed on a bottom of the interim plate.

5. The system of claim 1, a dosing inlet of the plurality of dosing inlets being placed on a side of the interim plate.

6. The system of claim 1, a dosing inlet of the plurality of dosing inlets being placed to dose the protein extrudate at a specific point in the static mixer.

7. The system of claim 6, a dosing inlet of the plurality of dosing inlets being placed to dose the protein extrudate directly into the protein extrudate flowing through the static mixer.

8. The system of claim 1, a dosing inlet of the plurality of dosing inlets being placed to dose the protein extrudate before the static mixer.

9. The system of claim 1, a dosing inlet of the plurality of dosing inlets being placed to dose the protein extrudate when the protein extrudate is still above room temperature.

10. The system of claim 9, the dosing inlet of the plurality of dosing inlets being placed to dose the protein extrudate when the protein extrudate has fibers and structures that have not been set.

11. The system of claim 1, a dosing inlet of the plurality of dosing inlets being placed to dose the protein extrudate when the protein extrudate has travelled further along the interim plate from the at least one static mixer.

12. The system of claim 11, the dosing inlet of the plurality of dosing inlets being placed to dose the protein extrudate when the protein extrudate has fibers and structures that are structured and cooler than the extruder.

13. The system of claim 1, further comprising a portion of the plurality of dosing inlets being in an open position to allow addition of an ingredient and the other portion of the plurality of dosing inlets being in a closed position to not allow addition of an ingredient.

14. The system of claim 1, a dosing inlet of the plurality of dosing inlets directly attached to an aperture of the static mixer.

15. The system of claim 1, a dosing inlet of the plurality of dosing inlets directly attached to an opening of the static mixer.

16. The system of claim 1, wherein a dosing inlet of the plurality of dosing inlets is mounted for dosing directly into a core of a product stream.

17. The system of claim 16, wherein the dosing inlet of the plurality of dosing inlets is mounted for dosing directly into the core of a product stream with a pipe-in-pipe assembly.

18. The system of claim 1, further comprising a cone directing the enhanced extrudate toward the one or more interim plate outlets.

19. A system for dosing and mixing ingredients in a High Moisture Extrusion process, the system comprising:

an extruder to mix ingredients to turn them into a protein extrudate;

a cooling die to cool the protein extrudate and to cool an enhanced extrudate with ingredients added after the extruder; and an interim plate connecting the extruder and the cooling die, to add and mix further ingredients, and facilitate movement of the protein extrudate and the enhanced extrudate into the cooling die, the interim plate further comprising:

one or more interim plate inlets to allow the entry of the protein extrudate from the extruder into the interim plate;

a dosing inlet for adding new ingredients to the protein extrudate that exits the extruder and enters the interim plate;

an at least one static mixer, which mixes the new ingredients with the protein extrudate to form the enhanced extrudate;

wherein the dosing inlet is placed to dose the protein extrudate when the protein extrudate has travelled further along the interim plate from the at least one static mixer;

one or more flow channels to facilitate the movement of the protein extrudate and the enhanced extrudate through the interim plate and into one or more channels of the cooling die; and one or more interim plate outlets to allow the flow of the protein extrudate and the enhanced extrudate into the cooling die.

20. A system for dosing and mixing ingredients in a High Moisture Extrusion process, the system comprising:

an extruder to mix ingredients to turn them into a protein extrudate;

a cooling die to cool the protein extrudate and to cool an enhanced extrudate with ingredients added after the extruder; and an interim plate connecting the extruder and the cooling die, to add and mix further ingredients, and facilitate movement of the protein extrudate and the enhanced extrudate into the cooling die, the interim plate further comprising:

one or more interim plate inlets to allow the entry of the protein extrudate from the extruder into the interim plate;

a dosing inlet for adding new ingredients to the protein extrudate that exits the extruder and enters the interim plate;

an at least one static mixer, which mixes the new ingredients with the protein extrudate to form the enhanced extrudate;

wherein the dosing inlet is directly attached to an opening of the static mixer;

one or more flow channels to facilitate the movement of the protein extrudate and the enhanced extrudate through the interim plate and into one or more channels of the cooling die; and one or more interim plate outlets to allow the flow of the protein extrudate and the enhanced extrudate into the cooling die.

* * * * *